United States Patent [19]

Foster et al.

[11] Patent Number: 5,150,541
[45] Date of Patent: Sep. 29, 1992

[54] DEVICE FOR KILLING INSECTS

[75] Inventors: James P. Foster, Chadds Ford, Pa.; Philip V. Jennings, Wilmington, Del.

[73] Assignee: E. I. Du Pont de Nemours and Company, Wilmington, Del.

[21] Appl. No.: 597,404

[22] Filed: Oct. 15, 1990

Related U.S. Application Data

[63] Continuation-in-part of Ser. No. 340,287, Apr. 19, 1989, abandoned.

[51] Int. Cl.⁵ .............................................. A01M 1/20
[52] U.S. Cl. .................................................... 43/131
[58] Field of Search ................ 43/107, 124, 131, 132.1

[56] References Cited

U.S. PATENT DOCUMENTS

| | | | |
|---|---|---|---|
| 1,013,514 | 1/1912 | Rand | 43/131 |
| 1,477,273 | 12/1923 | Liss | 43/131 |
| 3,108,391 | 10/1963 | Sipos | 43/131 |
| 4,310,985 | 1/1982 | Foster | 43/131 |
| 4,802,303 | 2/1989 | Floyd | 43/131 |

Primary Examiner—Kurt Rowan
Attorney, Agent, or Firm—James A. Costello

[57] ABSTRACT

This invention concerns a device for killing insects consisting essentially of (i) a toxin-containing element, and (ii) a mesh covering for the toxin-containing element of (i) to protect nontarget organisms from contact with the toxin, the toxin-containing element comprising about 50% to 78% of the surface area and the mesh covering comprising about 22% to 50%; and a method for killing insects by exposing them to contact with the described device.

12 Claims, 4 Drawing Sheets

DEVICE FOR KILLING INSECTS

This is a continuation-in-part of Ser. No. 340,287, filed Apr. 19, 1989, now abandoned.

BACKGROUND OF THE INVENTION

This invention concerns a device for killing insects especially flying insects and most especially flies. For the sake of brevity, the description provided hereafter will refer to the device primarily in its capacity to kill flies.

Certain 2-(nitromethylene)-1,3-thiazines and derivatives thereof are disclosed in U.S. Pat. Nos. 3,993,648, 4,501,742 and 4,065,560 as having useful insecticidal activity against the house fly (Musca domestica). The insecticidal activity of tetrahydro-2-(nitromethylene)-2H-1,3-thiazine (TNMT) and other nitromethylene heterocycles are disclosed in Pesticides and Venom Neurotoxicity, Shankland et al., pages 153 to 169 (1978). The physical, chemical and insecticidal properties of these compounds are further disclosed in Advances in Pesticide Science, Part 2, Geissbuhler et al., pages 206 to 217, Symposia Papers from Fourth International Congress of Pesticide Chemistry, July, 1978.

There are myriad patent disclosures of fly traps going back at least to the mid-1800's. One of the more recent patents on this subject matter is U.S. Pat. No. 4,310,985 which discloses use of the preferred toxicants described herein in an insect trap comprising a hollow base section having a containment cavity to hold the dead insects.

One primary distinction enjoyed by the devices of this invention over earlier flytraps is that the toxic area of the instant device comprises such a large proportion of the total surface area and is accessible and visible to target insects. No housing or other structural components are required for the device to be operative. There is no necessity to lure insects into an inner chamber or to entice them to any one portion of the surface.

SUMMARY OF THE INVENTION

This invention concerns a device for killing insects consisting essentially of:

(i) a toxin-containing element which is visible and available to target insects except for about 22% to 50% of its surface which is covered by (ii) a mesh that protects nontarget organisms from contact with the toxin; the toxin being (iii) tetrahydro-2-(nitromethylene)-2H-1,3-thiazine or its N-formyl derivative; wherein the device operates dry.

It is preferred that the toxin-containing element is formed from material of substantially triangular or quadrangular shape derivable from material in the shape of a rectangle without significant loss of material. This invention also concerns a method for killing insects comprising exposing them to contact with the described device.

The device of this invention contains effective amounts of an arthropodicidally active toxin in a toxin-containing element which is freely accessible and visible to target insects except for a relatively open-mesh covering whose primary purpose is to protect nontarget organisms from contact with the toxin-containing element. The covering can also serve as a substrate for attractants including sex attractants, food and the like which will attract insects to the surface of the device thus maximizing the effect of the device in controlling them.

For the sake of simplicity, the covering will be referred to as a "mesh" it being understood that said term encompasses any geometric shape or design that will accomplish the purpose of protecting non-target organisms from contact with the toxin. Although not necessary to the primary function of the device, the mesh does provide an important measure of safety. The mesh can be woven in the shape of a grid, lattice or an open lace. Alternatively, the safety feature can be met by a series of short protuberances or spars protruding from the target surface with the toxin nestled in the valleys therebetween, or by a series of depressions which hold the toxin with the higher surface plateau serving to prevent contact with the toxin. There are numerous other possibilities, including an embossed surface, consistent with the caution that the mesh should not interfere in any substantial way with the inclination of the insect to feed at the toxic surface(s) and that it should not trap dead insects. The term "mesh" is intended to cover these and any other means of preventing contact with the toxin that will readily occur to one skilled in the art.

It has been found that adequate protection against incidental contact with the toxin-containing surface of the device is afforded by mesh covering at least about 22% of the surface. It is preferred that the mesh cover no more than about 35% of the surface for the sake of improved efficiency of the device.

When the surface is embossed as described in Example 3, the toxin-containing depressions will comprise about 78% of the surface area with the remaining raised area allowing contact with the device by humans and pets but preventing contact with the toxicant.

The device can also contain an insect lure. Other optional features comprise an insect pheromone or other attractant and an insect food. To simplify discussion of the device and its use, the descriptions provided hereafter will be confined to "flies" with the understanding that they are applicable to other insects as well.

Representative of the insects against which the devices of this invention have been found most effective are flies of the genus Musca, including the house fly (Musca domestica) and the bush fly (Musca vertustissima), as well as flies of other families, such as the blow fly (Calliphora vomitoria), the fruit fly (Drosophila melanogaster), the stable fly (Stromoxys calcitrans) and the little house fly (Fannia spp.).

The preferred toxicants are tetrahydro-2-(nitromethylene)-2H-1,3-thiazine (TNMT) and the N-formyl derivative of TNMT as well as agriculturally suitable salts thereof. The salts are included within the expressions TNMT and N-formyl derivative of TNMT. Additional details on preparation of toxicants can be found in U.S. Pat. Nos. 3,993,648, 4,501,742 and 4,065,560. The high water solubility of TNMT at room temperature promotes the fast takeup of a lethal dose by the flies when feeding and facilitates operation of the trap. The compound is nonvolatile in ordinary use, thereby releasing no harmful vapors to the atmosphere. Flies are readily attracted to feed on the device, since TNMT has little or no repellancy toward the insects.

DETAILS OF THE INVENTION

The house fly is believed to activate its feeding mechanism after receiving appropriate stimuli via chemoreceptors believed to exist on its tarsi or feet. The feeding mechanism then involves a process wherein the fly lowers its proboscis to the surface upon which it has landed, expels saliva through the proboscis and finally sucks back whatever solution results. This process is believed to be virtually automatic when the fly lands on an appropriate stimulatory surface. By this mechanism, a fly landing on the target area of the device described herein will probe through the mesh to contact the target surface and ingest a lethal dose of toxicant.

When the toxicant is used as described in the present invention, the devices are effective for several months so long as they are not exposed to inordinate amounts of direct sunlight. Finally, while TNMT is highly active against insects, it is much less so toward higher animal forms such as rats, rabbits and other mammals. This low mammalian toxicity coupled with the safety mesh contributes to its suitability for widespread use without danger to people, animals or other non-target organisms. Additional details concerning TNMT's physical and chemical properties, pheromones, and other attractants are provided after the Examples.

Figure 1:
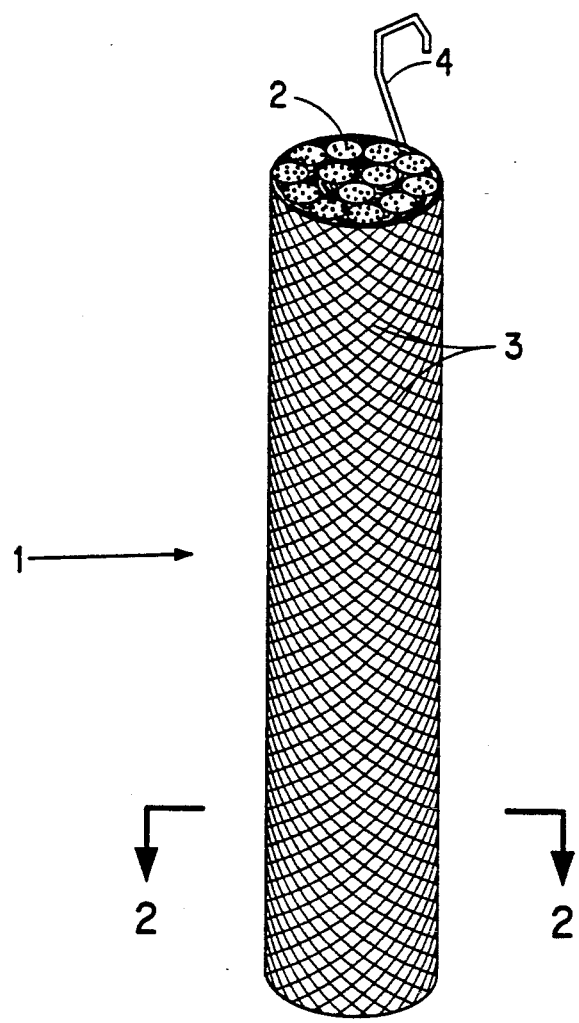
FIG. 1 is a front elevation of the insect-killing device with a solid core target area.

The following details can be understood most conveniently by reference to FIGS. 1 to 6D. In FIG. 1, the target area, 2, of the depicted device, 1, can be composed of any rope-like porous material such as bundles of fibers including natural and man-made fibers, felt, muslin, cloth, or blotter paper. The target is preferably white or yellow in dimly lit areas with a darkened background, or, black or red surrounded by white in brightly lit or light background locations. Maximum contrast between the target area and adjacent surroundings is most effective. The target area can be of any size. For best results, the surface of the target area should be pitched so that the dead flies roll or fall off to provide continuous access to the target area by newly arriving flies. Alternatively, the device is designed to be hung or mounted to facilitate the shedding of dead flies regardless of the particular geometry of the device.

The target area is covered with a closely-fitting mesh, 3, which can be expandable. The mesh should allow contact by the flies on the target area and will contain openings of a size sufficient to permit the flies to land and feed on the target area surface. However, the main function of the mesh is to prevent accidental contact of the target area by humans and domestic pets and its openings are suitably limited to a size which accomplishes this function. Furthermore, the thickness of the mesh is suitably limited such that the depth of the openings will allow a fly standing on the highest portion of the mesh to reach and ingest some of the toxicant on the target area surface and not interfere with the shedding of intoxicated flies. A mesh with openings at least two millimeters on a side and one millimeter thick is preferred. The color of the mesh is preferably the same color as the target area but it is not a requirement. An optional hanger, 4, is shown in FIG. 1 for suspending the device in areas of fly infestation. This hanger can be constructed from plastic monofilament line or other thin material so that it does not compete in attractiveness with the trap it suspends.

Figure 2:
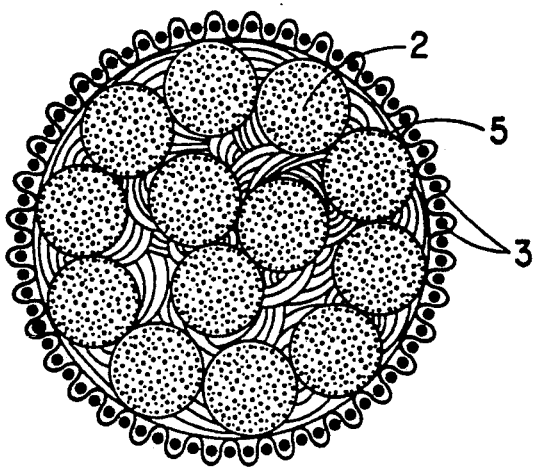
FIG. 2 is of a cross-section taken along line 2—2 of the device depicted in FIG. 1.

FIG. 2 depicts a device of this invention in cross-section wherein the toxicant is coated on or soaked into core, 2, with the interface, 5, between the toxin-coated core and the protective mesh, 3, forming the target area for flies.

Figure 3:
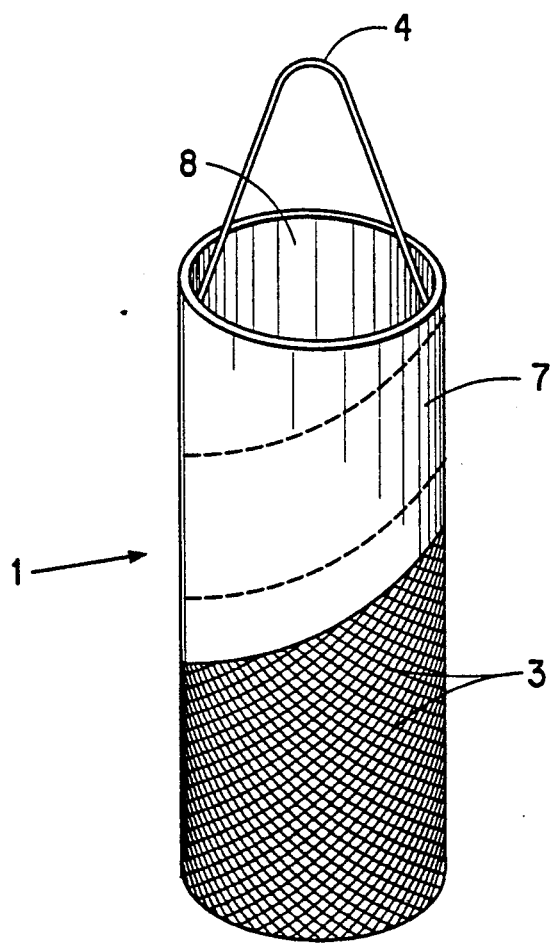
FIG. 3 is a fragmentary enlarged side layer-view of a cylindrical, hollow core embodiment of the device of this invention.

In FIG. 3, the device is depicted as being hollow. This results in a materials savings for devices of larger diameters ($>\frac{1}{2}"$). The diameter of the cylinder formed by the target area can vary according to the application contemplated but will be sufficient to serve as a landing site for the particular insect being attracted. Typically, the solid core is of lesser diameter than the hollow one, and is usually less than 1 inch in diameter. The hollow core can be any diameter.

The target area 7 can be constructed from a variety of materials including paper and polymers such as polyolefins and will be covered with safety mesh, 3. The preferred materials for constructing the target area include paper or other biodegradable materials. The target area is preferably of a shape which would allow the device as a whole to be free-standing on level surfaces. Its configuration is preferably box-shaped, rectangular or cylindrical, with a cylindrical configuration preferred. The target area can be embossed with contrasting vertical lines and/or representations of standing flies since these are believed to aid in attracting flies to the device. The device can also be adapted to operate with a wetted surface in a manner that will be obvious to one skilled in the art, for instance, by using materials that are fashioned in the shape of an enclosed cylinder that can be filled with water.

Figure 4A:
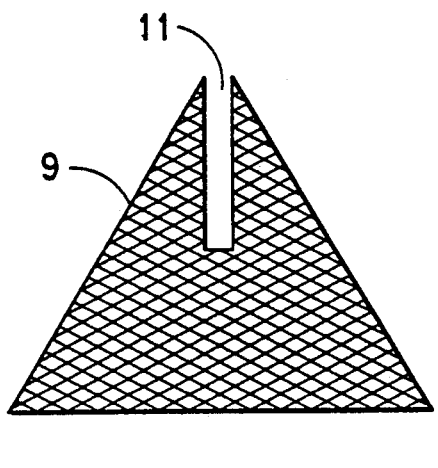
FIGS. 4A and 4B are each a side view of an embodiment of the device comprising triangular components designed to intersect to form a free-standing device.
Figure 4B:
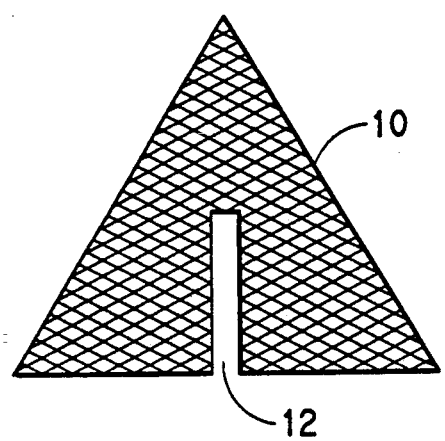

In FIGS. 4A and 4B a device is depicted which comprises intersecting triangular components 9 and 10. The optional notches, 11 and 12, in the components are designed to allow 10 to slip into 9 to form a free-standing device. Optionally, the device can be formed from either 9 or 10 alone (with or without the notches) which can be hung or folded to produce a free-standing device.

Figure 5:
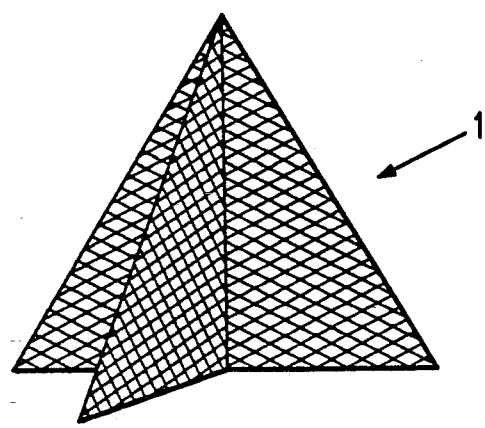
FIG. 5 is a side view of an embodiment formed from two intersecting triangular components utilizing an embossed surface with toxin-filled cavities.

FIG. 5 depicts the free-standing device formed by intersecting the triangular components depicted in FIGS. 4A and 4B.

Figure 6A:
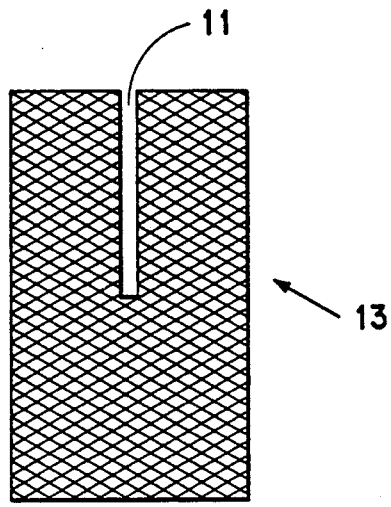
FIGS. 6A and 6B are each a side view of intersecting rectangular sections 13 and 14, respectively, of a free-standing device, FIG. 6C, utilizing an embossed surface.
Figure 6B:
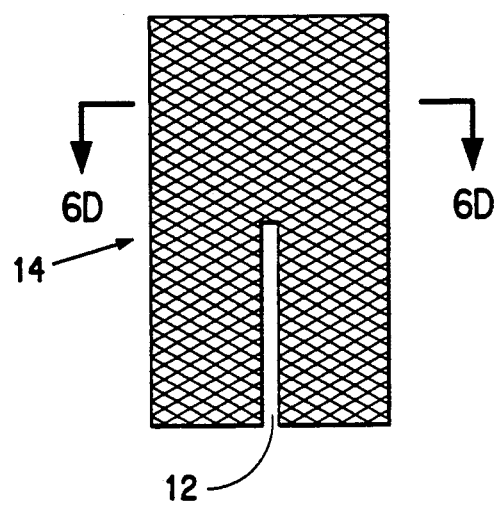
Figure 6C:
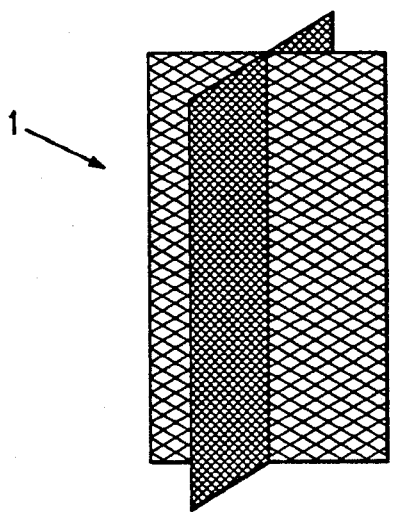
FIG. 6D is a cross-section taken along line 6D—6D of the rectangular device depicted in FIG. 6B.

FIGS. 6A and 6B depict rectangular components, 13 and 14, respectively, having optional notches, 11 and 12, the components being designed to allow 14 to slip into 13 to form a free-standing device such as depicted in 6C. Optionally, the device can be formed from either 13 or 14 alone (with or without the notches) which can be hung or folded to produce a free-standing device.

Figure 6D:

FIG. 6D depicts a device in cross-section taken along lines 6D—6D of the device depicted in FIG. 6B wherein toxicant is deposited into cavities 15 which are fashioned from embossed substrate 16. In this embodiment, it is preferred that cavities be less than about 5 mm in diameter to minimize potential contact with the toxicant.

Preferred devices are fabricated from stock materials such as paperboard, polymeric materials, wood and other cellulosics in rectangular shapes. From this stock, devices can be cut in any shape before or after the stock is treated with toxicant and covered by protective mesh (or embossed and treated with toxicant). The stock can be employed flat and hung or affixed to vertical surfaces or the triangular or quadrangular pieces of the device can be combined or folded to produce a free-standing device. For instance, two or more triangular or quadrangular pieces can bisect each other to form a free-standing device. The triangular or quadrangular pieces (which can have rounded corners) can be joined at the ends to form substantially conical or cylindrical shapes. When the beginning stock is substantially rectangular in shape, more or less repetitive patterns of triangles or quadrangles can be cut therefrom without undue waste of stock. A solid cylindrical device is a preferred embodiment of this invention.

A number of methods can be used to impregnate the porous surface of the target area with insecticide. For example, the target area can be prepared by soaking in a solution of TNMT and dried, the surface of the target area can be painted with a solution of TNMT, or TNMT can be sprinkled on the target area. The insecticide is typically applied so as to be present on the target area in the amount of at least about 2.0 milligrams per square centimeter or more. At a minimum, the insecticide concentration on a target area will be sufficient to constitute a lethal dose when ingested by the fly.

A preferred means of attracting the flies is the use of a sex attractant (pheromone). Muscalure (cis-9-tricosene) is the sex attractant of choice for houseflies; the sex attractant ca be contained in the target area or incorporated into mesh, 3. In its most preferred mode, the device incorporates all of the above means of attracting the flies. Foodstuffs of choice include sugar or corn syrup. The foodstuff can be deposited on the target area as a glaze or sprinkled on the target area. It is also contemplated that any one particular device can be designed with a removable fly-holding tray if desired.

The following Examples illustrate the invention.

EXAMPLE 1

Assembly of a device began with a three-foot section of 3/16" diameter braided clothesline which was dyed yellow. After the dyed clothesline was dry, a center section of the three-foot dyed clothesline was coated by brush on all sides with this TNMT technical glaze formulation:

| 1. polyvinylpyrrolidone (PVP) | 0.66 g |
| 2. corn syrup | 23.90 g |
| 3. 50/50 ethanol/distilled H₂O | 17.48 g |
| 4. technical grade TNMT | 5.00 g |

The corn syrup and ethanol/H$_2$O were placed into a container with stir bar and then the container was placed on a stir plate. PVP and technical TNMT were added and the mixture was stirred until well-dissolved. A section on each end of the three-foot clothesline was left without treatment and the clothesline was handled by the untreated areas. After the glaze formulation dried, the three-foot yellow clothesline was threaded through a section of ¼" diameter red mesh poly-net (Item #0403 from NSW Corp., 530 Gregory Avenue, N.E., Roanoake, Va. 24016). Then, 100 microliters of the fly attractant, cis-9-tricosene (muscalure), was placed along the two-foot treated section of rope/mesh with a pipet tip as evenly as possible.

This device has been found particularly useful in killing flies in areas experiencing high levels of fly populations, such as dairy barns, chicken houses or other confined animal quarters. It is characterized by equal accessibility by insects to all sides/surfaces of the target area and by its suitability for placement where bulkier devices comprising housing and containment structures could not be located. Individual devices have been found effective in killing hundreds of flies per day.

EXAMPLE 2

A yellow paper-wound core approximately ⅜-inch in diameter and 30 inches long obtained from SONOCO Inc. (Hartsville, S.C.) was coated by brush with a TNMT glaze formulation described below:

| polyvinylpyrrolidone (PVP) | 0.66 g |
| corn syrup | 23.90 g |
| 50% v/v ethanol/water | 17.48 g |
| TNMT technical | 5.10 g |

The coated core was then allowed to air dry. A section of red close mesh poly-net #0403 (NSW Corp.) was stretched over the tube along its entire length. A loop of monofilament line was affixed to one end and secured with hot melt adhesive.

EXAMPLE 3

The construction of a TNMT surface dispenser can begin with a triangular or quadrangular sheet of paperboard or other suitable material having a smooth moisture-proof surface on both sides. The dimensions of the sheet are such as to afford convenient handling for placement or hanging as the user sees fit.

The sheet can be coated on both sides with a mixture of toxicant, its carrier, and optional attractants or baits which are suited for the target insect. For instance, a mixture of 4 g of TNMT in 5mL of 50/50 v/v/ water ethanol solution containing 8 g of sucrose and 0.15 g of polyvinylpyrrolidine will provide a suitable mixture for houseflies. This mixture can be painted, rolled, or sprayed onto the surface(s) and allowed to dry. Muscalure (10 mg) can be pipeted at various points over the device.

In the case of an embossed surface, the material can be applied with a doctor blade or other suitable device to "squeegee" the liquid into the cavities on the surface. On evaporation of the solvent, the remaining material will shrink into the cavities. This design does not require a cover grill if the cavities are small enough to prevent incidental contact of a fingertip, for example, with the toxin. For circular depressions in a plane, the cavity surface would maximally constitute approximately 78% of the total toxin-bearing surface as given by the ratio of a circle of a given diameter to a square having a side of the same dimension. Practically speaking, the diameter of the cavities should be 5 mm or smaller.

After the film has dried, a plastic mesh can be applied over the film. This can be accomplished by applying an adhesive to the mesh and pressing it onto the treated surface. The openings in the mesh should have suitable dimensions to permit casual handling of the device without the fingers actually contacting the toxic film under the mesh.

Toxicant

Certain physical and chemical properties of nitromethylene heterocycles are known. For example, insecticidal activity of TNMT against the house fly (Musca domestica) was determined by directly spraying the insects in a wind tunnel. The compound has the formula:

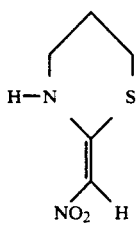

and a toxicity quotient of 161 vs. 100 for ethyl parathion. The physical Properties of TNMT are as follows:

| | |
|---|---|
| Melting point, °C. | 78 |
| Solubility, % weight/volume | Water, 20 |
| | Acetone, 7 |
| Hydrolytic Stability | 3 hours at pH 1.1 |
| (half life) | over 3 months at pH 7.0 |
| Photochemical Stability | Water, 10 minutes |
| (half life, 350 nm simulated sunlight, 100 ppm) | $CH_2Cl_2$, 1 minute |

The structure of the N-formyl derivative of TNMT is as follows:

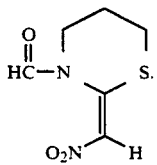

Pheromones and Attractants

Pheromones or attractants may be classified as sex, food, or oviposition lures. Additional classifications or subclassifications include trail pheromones, aggregating and other pheromones. Broadly defined, a sex pheromone is an odor released by one member of the species which attracts the opposite member for the purpose of mating. The presence of sex pheromones has been demonstrated in most orders of insects and they can be produced by the male or female of the species. In many cases, it is the female which produces the attractant. A large number of pheromones that are useful in the devices of this invention have been identified and created synthetically including those listed in the Table.

TABLE

| Compounds | Insect |
|---|---|
| cis-7-dodecenyl acetate | cabbage looper *Trichoplusia ni* |
| cis-8-dodecenyl acetate | oriental fruit moth *Grapholitha molesta* |
| cis-7,8-epoxy-2-methyloctadecane | gypsy moth *Lymantria dispar* |
| undecanal undecan-1-al | greater wax moth *Galleria mellonella* |
| cis-2-isopropenyl-1-methylcyclobutaneethanol | boll weevil *Anthonomus grandis* |
| 2-methylheptadecane | tiger moths *Holomelina aurantiaca* complex |
| trimedlure | mediterranean fruit fly *Ceratitis capitata* |
| cuelure | melon fly *Dacus cucurbitae* |
| cis-9-tricosene | housefly *Musca domestica* |

We claim:
1. A device for killing insects, which device is in the shape of a solid cylinder, intersecting rectangles, or intersecting triangles whose surface comprises:
   (i) a toxin-containing element which is visible and available to target insects except for about 22% to 50% of its surface which is covered by
   (ii) a mesh that protects nontarget organisms from contact with the toxin; the toxin being
   (iii) tetrahydro-2-(nitromethylene)-2H-1,3-thiazine or its N-formyl derivative; wherein the device operates dry.
2. A device according to claim 1 wherein no more than about 35% of the surface is covered by mesh.
3. A device according to claim 1 employing a sex attractant.
4. A device according to claim 3 wherein the attractant is muscalure.
5. A device according to claim 1 employing a feeding stimulant which is sweet.
6. A device according to claim 5 wherein the feeding stimulant is sugar or corn syrup.
7. A device according to claim 1 in the shape of a cylinder covered by an expandable plastic net.
8. A device according to claim 1 in the shape of intersecting triangles.
9. A device according to claim 1 in the shape of intersecting rectangles.
10. A device according to any one of claims 7 to 9 which is fee-standing.
11. A device according to claim 1 wherein the target insects are from the genus Musca.
12. A method for killing insects comprising exposing them to contact with a device according to claim 1.

* * * * *